(12) United States Patent
Akenine-Moller et al.

(10) Patent No.: US 9,336,561 B2
(45) Date of Patent: May 10, 2016

(54) COLOR BUFFER CACHING

(71) Applicant: Intel Corporation, Santa Clara, CA (US)

(72) Inventors: Tomas G. Akenine-Moller, Lund (SE); Jim K. Nilsson, Lund (SE)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 13/719,358

(22) Filed: Dec. 19, 2012

(65) Prior Publication Data

US 2014/0168244 A1    Jun. 19, 2014

(51) Int. Cl.
*G06T 1/60*    (2006.01)
*G06T 15/00*    (2011.01)

(52) U.S. Cl.
CPC *G06T 1/60* (2013.01); *G06T 15/005* (2013.01)

(58) Field of Classification Search
CPC .................................................. G06T 1/60
See application file for complete search history.

(56) References Cited

U.S. PATENT DOCUMENTS

| | | | |
|---|---|---|---|
| 6,636,232 B2 * | 10/2003 | Larson | 345/611 |
| 7,737,985 B2 * | 6/2010 | Torzewski et al. | 345/557 |
| 7,898,550 B2 | 3/2011 | Prokopenko | |
| 8,089,486 B2 | 1/2012 | Anderson | |
| 2003/0218608 A1 | 11/2003 | Chin | |
| 2007/0139440 A1 * | 6/2007 | Crow et al. | 345/614 |
| 2009/0160857 A1 * | 6/2009 | Rasmusson et al. | 345/422 |
| 2011/0164038 A1 | 7/2011 | Jung | |
| 2011/0292032 A1 * | 12/2011 | Yang | 345/419 |
| 2012/0183215 A1 | 7/2012 | Van Hook | |
| 2012/0281004 A1 * | 11/2012 | Shebanow et al. | 345/557 |

OTHER PUBLICATIONS

Rasmusson, J., et al., "Error-bounded Lossy Compression of Floating-Point Color Buffers using Quadtree Decomposition", The Visual Computer 26, No. 1 (2010): 17-30.
Strom, J., et al., "Floating-Point Buffer Compression in a Unified Codec Architecture", In Proceedings of the 23rd ACM SIGGRAPH/EUROGRAPHICS symposium on Graphics hardware, (Jun. 2008), (pp. 75-84). Eurographics Association.
PCT International Search Report and Written Opinion issued in corresponding PCT/US2013/072835 dated Mar. 13, 2014, (pages).
TW Search Report issued in corresponding TW 102144585 dated Feb. 12, 2015, (2 pages) [including English translation].

* cited by examiner

*Primary Examiner* — Kee M Tung
*Assistant Examiner* — Ryan M Gray
(74) *Attorney, Agent, or Firm* — Trop Pruner & Hu, P.C.

(57) ABSTRACT

A color buffer cache may be implemented in a way that reduces memory bandwidth. In one embodiment this may be done by determining whether a corresponding tile being rendered is completely inside a triangle. If so, the cache lines that correspond to this tile may be marked as "less useful". As a result of being marked as less useful, those cache lines may be replaced before other cache lines in one embodiment. Thus a color buffer cache is used for those tiles that overlap with at least one triangle edge. The use of such a color buffer cache scheme may be more efficient and therefore may reduce memory bandwidth in some embodiments.

31 Claims, 5 Drawing Sheets

COLOR BUFFER CACHING

BACKGROUND

This relates generally to graphics processing for computers and particularly to caching data in a color cache.

In order to increase performance for graphics processing units (GPUs), memory bandwidth reduction techniques are employed. One way to decrease the bandwidth requirements is to perform buffer compression. A graphics system may use a color buffer where the colors of the pixels are drawn and a depth buffer where the depth of each pixel is stored. During rendering, these buffers are read and written to, and often the same pixel is accessed several times for both buffers. These read and write accesses are expensive in terms of energy consumption and may advantageously be reduced to the extent possible, in particular for user terminals with limited power supply, such as mobile devices.

BRIEF DESCRIPTION OF THE DRAWINGS

Some embodiments are described with respect to the following figures.

DETAILED DESCRIPTION

In accordance with some embodiments, a color buffer cache may be implemented in a way that reduces memory bandwidth. In one embodiment this may be done by determining whether a corresponding tile being rendered is completely inside a triangle. If so, the cache lines that correspond to this tile may be marked as "less useful". As a result of being marked as less useful, those cache lines may be replaced before other cache lines in one embodiment. Thus a color buffer cache is used for those tiles that overlap with at least one triangle edge. The use of such a color buffer cache scheme may be more efficient and therefore may reduce memory bandwidth in some embodiments.

Buffer compression/decompression can be used in three-dimensional (3D) graphics, such as games, 3D maps and scenes, 3D messages, e.g. animated messages, screen savers, man-machine interfaces (MMIs), etc., but is not limited thereto. Thus, the compression/decompression may also be employed for encoding other types of images or graphics, e.g. one-dimensional (1D), two-dimensional (2D) or 3D images.

The compression and decompression collectively handles a plurality of pixels, typically in the form of a block or a tile of pixels. In an embodiment, a pixel block has the size of M×N pixels, where M, N are integer numbers with the proviso that both M and N are not simultaneously one. Preferably, $M=2^m$ and $N=2^n$, where m, n are zero or integers with the proviso that m and n are not simultaneously zero. In a typical implementation M=N and such block embodiments may be 4×4 pixels, 8×8 pixels or 16×16 pixels.

The expression pixel or "block element" refers to an element in a block or encoded representation of a block. This block, in turn, corresponds to a portion of an image, texture or buffer. Thus, a pixel may be a texel (texture element) of a (1D, 2D, 3D) texture, a pixel of a (1D or 2D) image or a voxel (volume element) of a 3D image. Generally, a pixel is characterized with an associated pixel parameter or property value or feature. There are different characteristic property values that can be assigned to pixels, typically dependent on what kind of pixel block is being handled. For instance, the property value may be a color value assigned to the pixel. Different color spaces are available for representing pixel color values. One color space is the so-called red, green, blue (RGB) color space. A pixel property value may therefore be a red value, a green value or a blue value of an RGB color.

A pixel color can also be expressed in the form of luminance and chrominance components. In such a case, a transform can be used for converting a RGB color value into a luminance value and, typically, two chrominance components. Examples of luminance-chrominance spaces include YUV, $YC_oC_g$ and $YC_rC_b$. A property value can therefore also be a luminance value (Y) or a chrominance value (U, V, $C_o$, $C_g$, $C_r$, or $C_b$). In the case of compressing/decompressing pixel blocks of a color buffer, RGB colors of pixels may be converted into the luminance/chrominance color space. This not only decorrelates the RGB data leading to improved compression rates but also allows the possibility of having different compression strategies for the luminance and chrominance components. Thus, as the human visual system is more susceptible to errors in the luminance component, the chrominance components can typically be compressed more aggressively than the luminance component.

Figure 1:
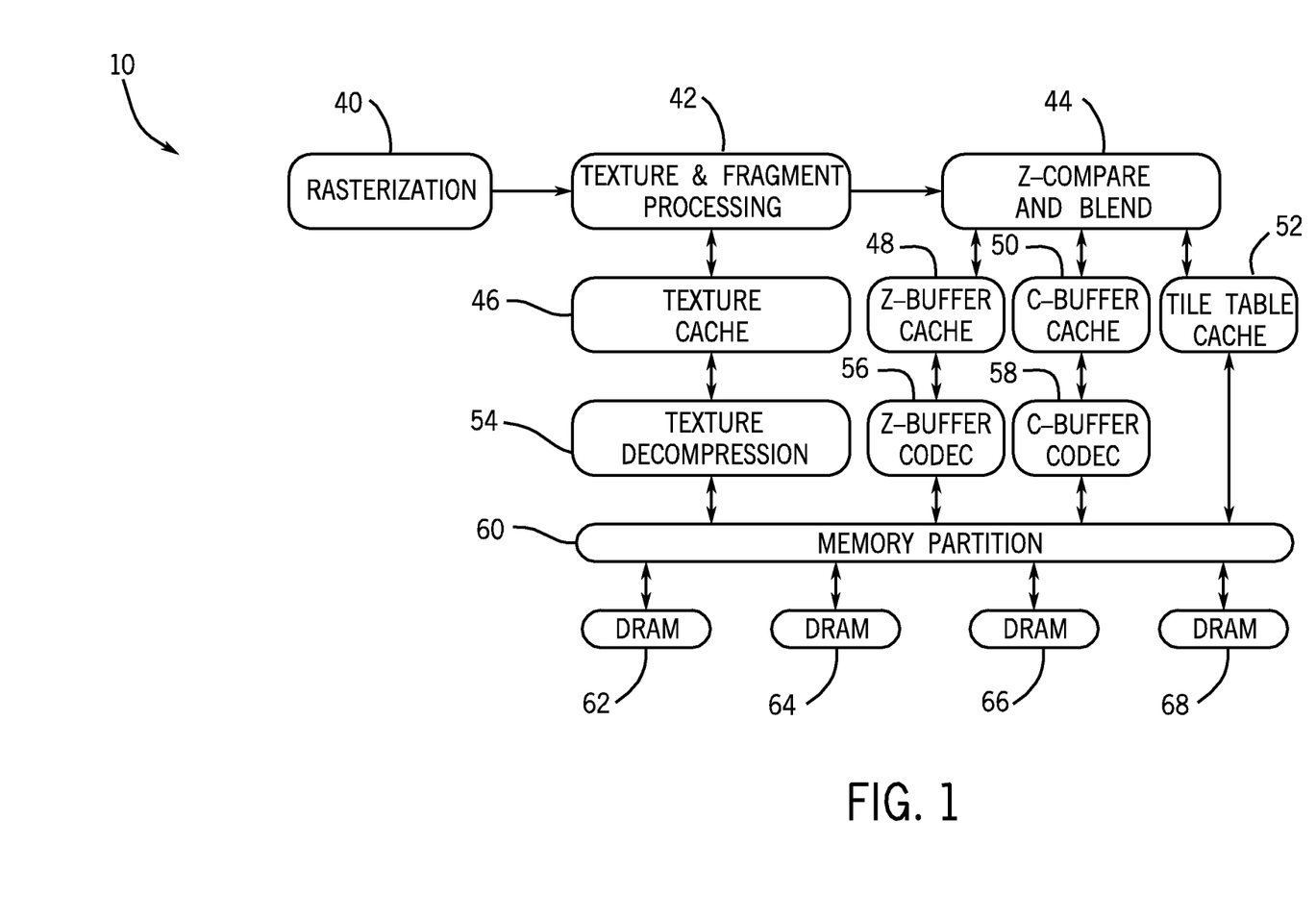
FIG. 1 is a schematic depiction of one embodiment.

In FIG. 1, a graphics processor 10 may include a rasterization pipeline including a rasterization unit 40, a texture and fragment processing unit 42, and a depth or Z compare and blend unit 44. Each of these units may be implemented in whole or in part by software or hardware in some embodiments.

The texture and fragment processing unit 42 is coupled to a texture cache 46. The cache 46 is in turn coupled to a memory partition 60 through a texture decompression module 54. Thus, texture information stored in the cache may be decompressed between the memory partition and the cache.

The depth compare and blend unit 44 is coupled to a depth buffer cache 48, a color buffer cache 50 and a tile table cache 52. In turn, the depth buffer cache 48 is coupled to the memory partition 60 through the depth buffer coder/decoder (codec) 56. Likewise, the color buffer cache 50 couples the memory partition 60 through the color buffer coder/decoder (codec) 58. The memory partition 60 may be coupled to dynamic random access memory (DRAM) 62, 64, 66 and 68 which may be part of system memory. In some embodiments, a unified cache may be used that includes the texture cache, the depth buffer cache and the color buffer cache.

In some embodiments, a unified codec may replace the units 54, 56, and 58. Various configurations are described in further detail in the article, *Floating Point Buffer Compression in a Unified Codec Architecture* by Ström, et al. Graphics Hardware (2008).

When triangles are being rasterized, a bounding box of a projected triangle may be identified. Then tiles (i.e. rectangular regions of pixels) may be visited inside that box. For each tile, a tile test determines where the tile overlaps with the triangle. For a person skilled in the art, it is easy to realize that the triangle can be traversed in many different ways. In order for the triangle traversal to be efficient, a tile test is used. Only tiles overlapping the triangle need further processing. For such tiles, each pixel or sample is inside tested against the triangle. In some cases a bounding box is not needed. In some cases a projected triangle is not needed either.

A test may determine whether a tile is completely inside a triangle. The results of this test may be used for efficient depth buffer compression.

Figure 3:
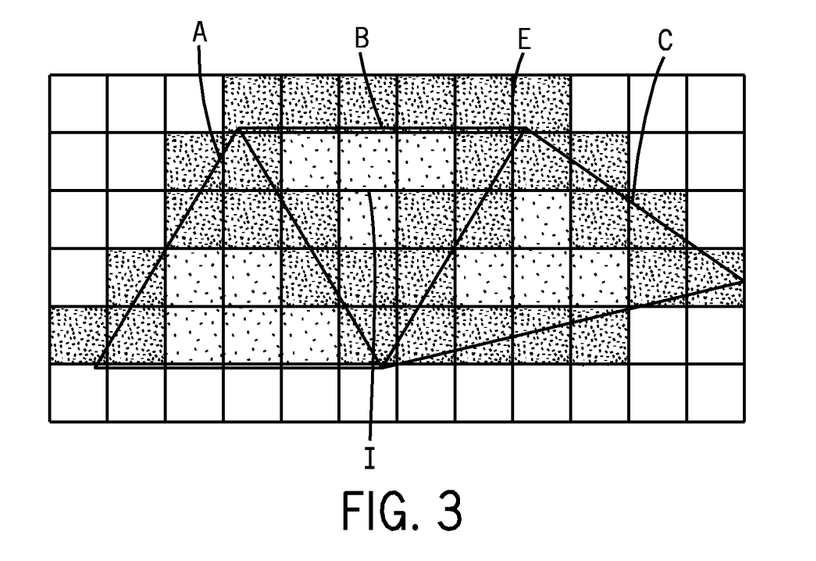
FIG. 3 is a depiction of triangles being rendered according to one embodiment.

The color buffer cache is most useful for tiles that overlap with at least one triangle edge. Namely, those tiles that are completely inside a triangle will not share color buffer content with neighboring triangles. For example as shown in FIG. 3, the triangles A, B, and C have tiles indicated by the letter E that overlap with triangle edges and tiles indicated by the letter I that do not overlap. For a tile E, one triangle will access a subset of the content of the depths and colors of the tile, while the other triangle (sharing an edge with the first triangle) may access another subset (disjoint with the first triangle's subset) of the same tile. For tile I, only a single triangle will access the contents of those tile, and hence, there is no point in having them in the cache after all processing of the tile I has finished for the corresponding triangle.

In general, the tiles I are less useful in the cache since their contents are not shared between triangles. If the color buffer cache is large enough, triangles being rendered later may of course overlap tiles that previously were completely inside a rendered triangle and so there can be memory bandwidth savings even for tiles I. However, these savings often occur much later (in terms of the number of triangles being rendered), often need very large caches and their effect is relatively small.

By marking cache lines in the color cache if the corresponding tile was completely inside the triangle as "less useful", efficiencies may be achieved. Caches typically throw out or replace cache lines in a least recently used (LRU) order, or using other replacement strategies, such as pseudo-LRU, least recently allocated (FIFO), random, etc. In some embodiments, the cache may throw out or replace cache lines marked less useful first and then replace using a least recently used replacement policy according to some other replacement policy.

Performance may be improved in some embodiments because the color cache is needed primarily for tiles with triangle edges in them and therefore such tiles are given a higher priority. In addition, color compression of the color buffer cache content will apply more often for tiles completely inside a triangle and in general, these tiles are simpler to compress, further reducing memory bandwidth consumption in some embodiments.

Figure 2:
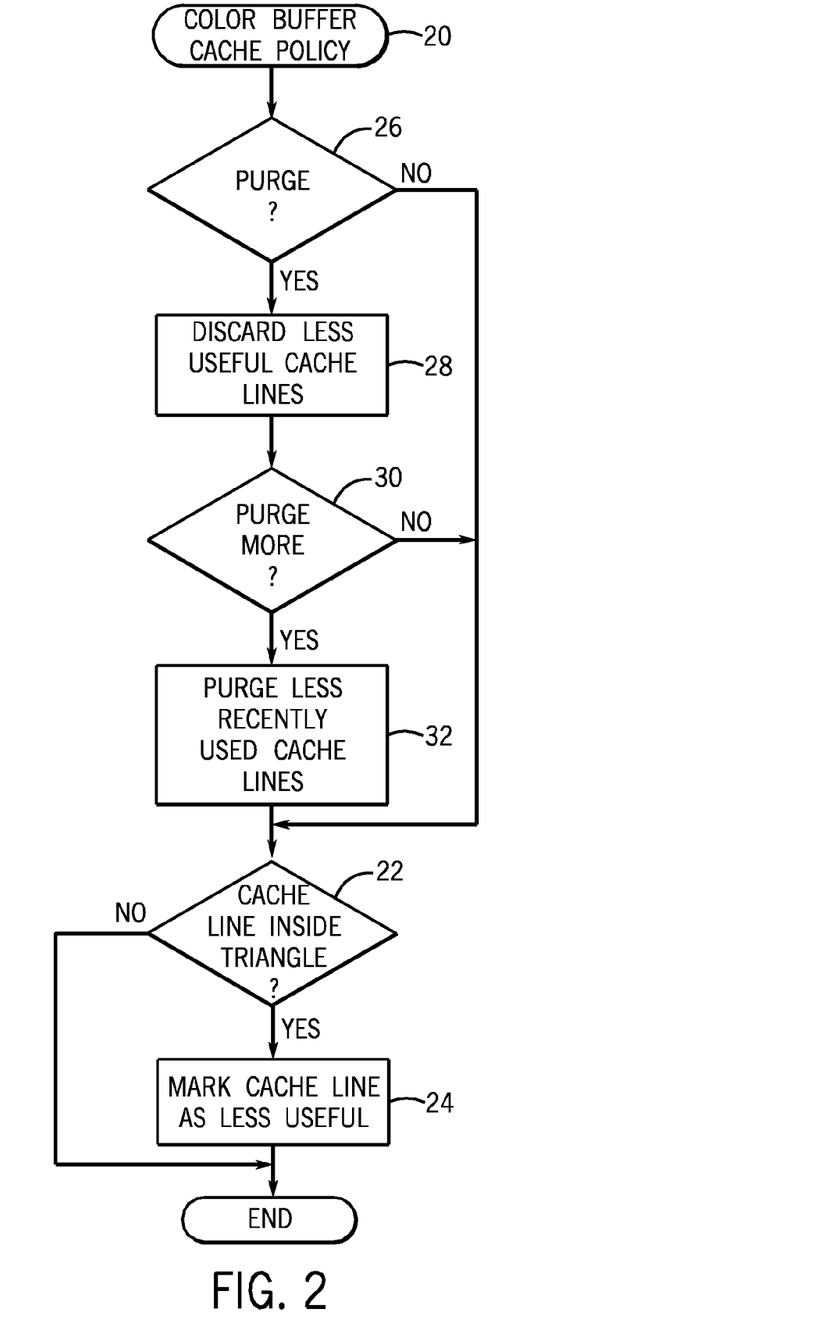
FIG. 2 is a flow chart for one embodiment.

Referring to FIG. 2, a sequence 20 for a color buffer cache policy may be implemented in hardware, software and/or firmware. In software and firmware embodiments it may be implemented by computer executed instructions stored in one or more non-transitory computer readable media such as a magnetic, optical or semiconductor storage media. Examples of such storage media may include the color buffer cache itself, the dynamic random access memory, or a processor associated therewith, such as a graphics processing unit, to mention a few examples.

The sequence may begin with a check at diamond 26 that determines whether to replace a given cache line. As indicated in block 28, less useful cache lines may be discarded first and, if more purging, is needed as determined in diamond 30, less recently used cache lines may be discarded as indicated in block 32. Other cache replacement policies may also be used.

Next it is determined if a given cache line is inside a triangle as indicated in diamond 22. If so, the cache line is marked as "less useful" as indicated in block 24 and otherwise it is not marked in one embodiment. Equivalently, cache lines may be marked as more useful instead of being marked as less useful.

In another embodiment, cache lines associated with less useful tiles may be handled using a single scratch pad of storage equivalent to a specialized cache and capable of storing only one or a limited number of cache lines for data belonging to the less useful tiles. As soon as processing of the data in the scratch pad is completed, the scratch pad can be refilled with another cache line, while not polluting other cache contents. This may prevent the reuse of data among overlapping triangles, but may maximize the cache effectiveness of data for shared triangle borders.

Still another embodiment is to let less useful data be mixed with other data in the cache. The replacement policy of the cache would then be adapted accordingly.

With a less recently used or less frequently used replacement policy, the inverted value of a less useful property can be stored in one highest bit of the age bits (or counter for the less frequently used policy) of a cache line. At eviction, this may guarantee that all cache lines associated with the less useful tile are replaced with other cache lines in the same set.

Another option is to use one bit as a less useful bit. For example if there are four bits for a counter, 1111 may indicate less useful while the counter then has to be clamped to 1110 (since that is now the highest number represented with those four bits since 1111 is used for other purposes).

Figure 4:
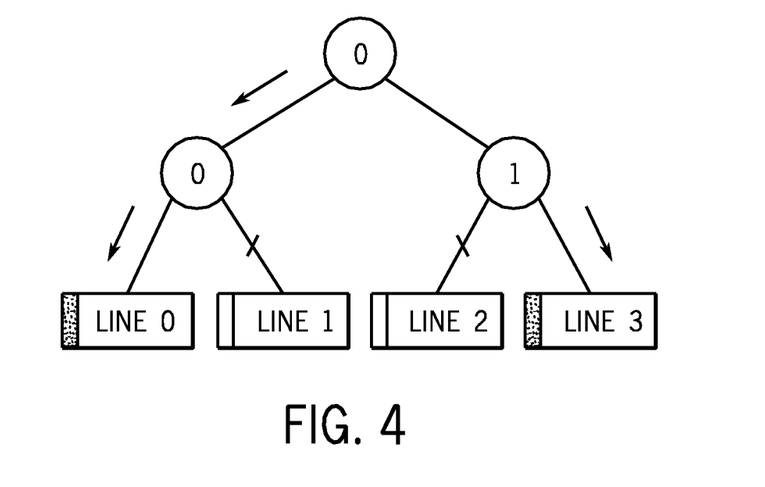
FIG. 4 is a depiction of a least recently used tree-based cache replacement scheme according to one embodiment.

With a tree-based pseudo least recently used policy, the least recently used bits may be augmented with a less useful bit per least recently used bit, which if set, prohibits switching between the least recently used bit until a less useful cache line is evicted. As shown in FIG. 4, when cache lines zero and three in a set have the less useful bit set, as indicated by their dark left edges, and set when the line was read into the cache. The pseudo least recently used pointers in the tree are therefore not allowed to switch direction as indicated by the cross bars on the lines to cache lines 1 and 2. For example, if cache line zero is evicted, this restriction is removed. Consequently, the effect of the less useful bit is that only data belonging to the less useful tiles participates in the least recently used cache line replacement policy.

For a bit based pseudo least recently used policy, the most recently used bits are also augmented with one less useful bit per most recently used bit. If the less useful bit is set, the corresponding most recently used bit is not allowed to be set. To uphold the pseudo least recently used property among the most recently used bits, the most recently used field is reset when the logical OR between all most recently used bits and all less useful bits is one.

If a multiple level hierarchy is used, there exist some further considerations regarding how different levels of the cache are handled. Here, two levels of cache are assumed but the concepts can be readily extended to more levels.

For cache allocation, one may allocate less useful data to the first level (L1) cache, and not the second level (L2) cache in one embodiment. This may prevent L2 cache pollution with data that is expected to be less frequently accessed than other data.

For less useful data evicted from the L1 cache, one option is to not write the data back to the L2 cache at all—while writing back the data to lower level caches or DRAM if needed—again limiting L2 cache pollution. Another option is to write back less useful data to the L2 cache, but with the corresponding least recently used policy (or other cache replacement policy) bits already set.

Figure 5:
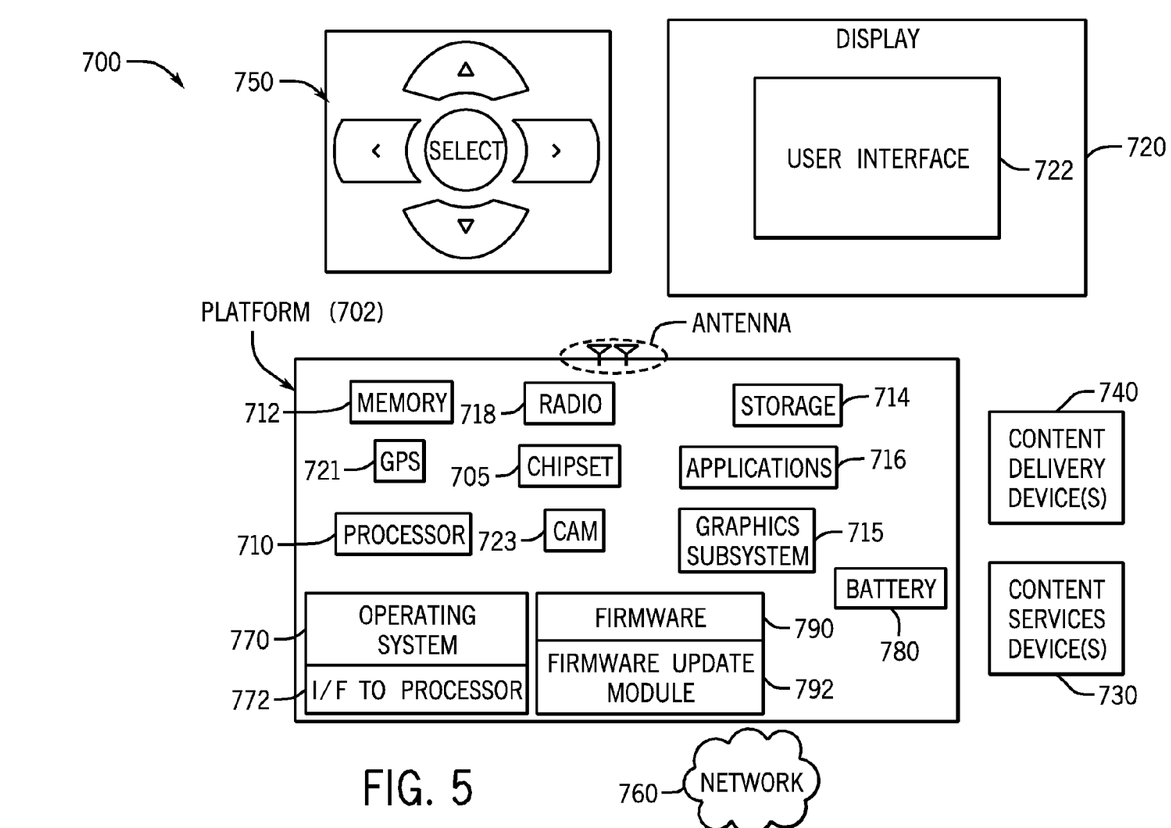
FIG. 5 is a system depiction for one embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
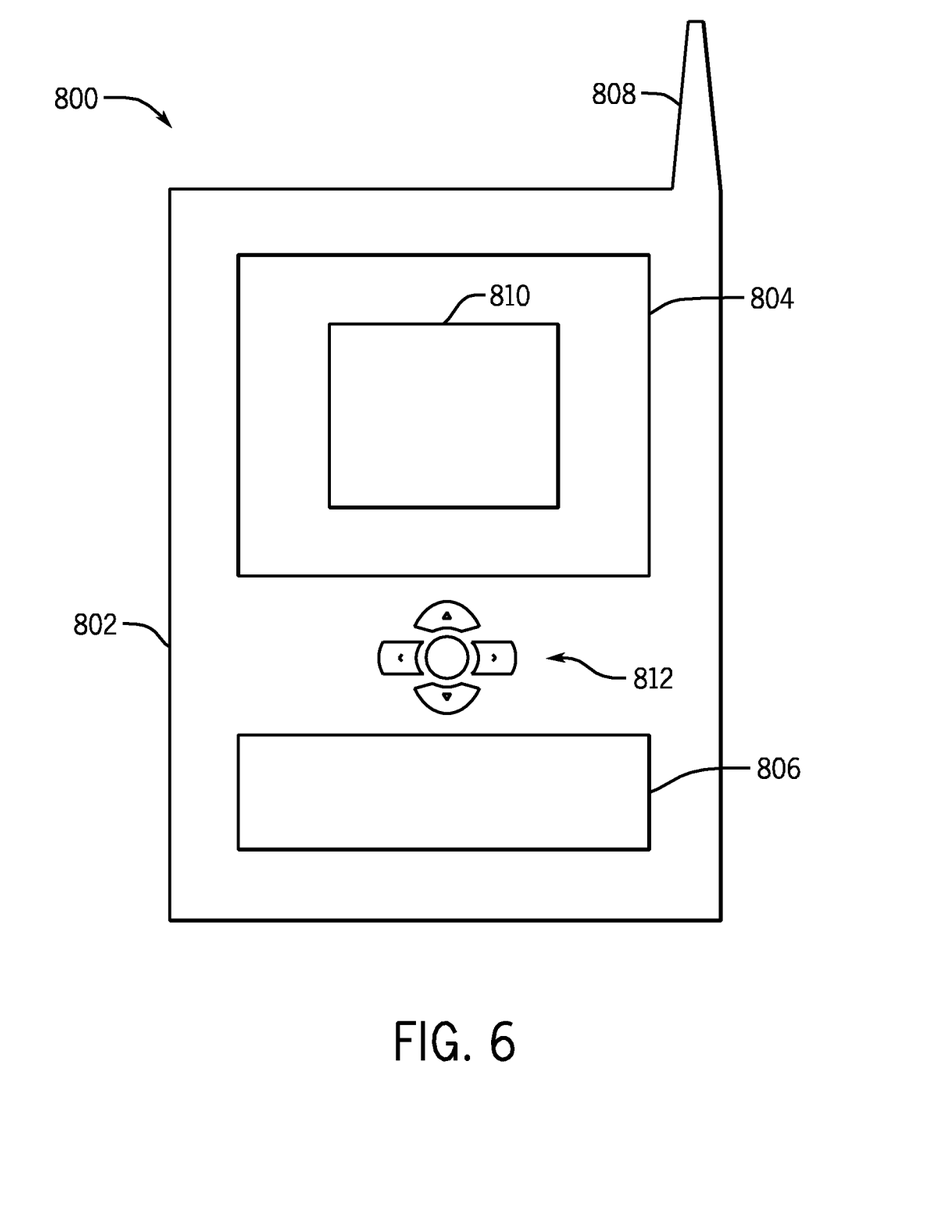
FIG. 6 is a front elevational view for one embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 2 in software and/or firmware embodiments.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer executed method comprising:
   determining whether a tile of pixels is inside, outside or partially outside of a triangle being rendered;
   indicating whether the tile is inside, outside or partially outside the triangle; and
   using the indication to implement a cache line replacement policy with one bit to indicate if tile is inside the triangle.

2. The method of claim 1 including marking tiles of cache lines that are wholly inside the triangle.

3. The method of claim 1 including replacing cache lines of tiles wholly inside a triangle before other cache lines are replaced.

4. The method of claim 3 including replacing cache lines using two different second cache replacement policies.

5. The method of claim 4 including replacing cache lines based on whether they are wholly within the triangle and then applying a different cache line replacement policy.

6. The method of claim 5 including using one of a least recently or least frequently used cache line replacement policy as the different cache line replacement policy.

7. The method of claim 5 including using a least recently used cache replacement policy with one bit to indicate a tile is inside the triangle per least recently used bit.

8. The method of claim 5 including using a most recently used cache replacement policy with one bit to indicate a tile is inside a triangle per most recently used bit.

9. The method of claim 1 including using a smaller capacity storage for cache lines in tiles entirely within the triangle and a larger capacity storage for cache lines in tiles partially overlapping the triangle.

10. One or more non-transitory computer readable media storing instructions to perform a sequence comprising:
    determining whether a tile of pixels is inside, outside or partially outside of a triangle being rendered;
    indicating whether the tile is inside, outside or partially outside the triangle; and
    using the indication to implement a cache line replacement policy with one bit to indicate if tile is inside the triangle.

11. The media of claim 10 further storing instructions to perform the sequence including marking tiles of cache lines that are wholly inside the triangle.

12. The media of claim 10 further storing instructions to perform the sequence including replacing cache lines of tiles wholly inside a triangle before other cache lines are replaced.

13. The media of claim 12 further storing instructions to perform the sequence including replacing cache lines using two different second cache replacement policies.

14. The media of claim 13 further storing instructions to perform the sequence including replacing cache lines based on whether they are wholly within the triangle and then applying a different cache line replacement policy.

15. The media of claim 14 further storing instructions to perform the sequence including using one of a least recently or least frequently used cache line replacement policy as the different cache line replacement policy.

16. The media of claim 11 further storing instructions to perform the sequence including using a least recently used cache replacement policy with one bit to indicate a tile is inside the triangle per least recently used bit.

17. The media of claim 14 further storing instructions to perform the sequence including using a most recently used cache replacement policy with one bit to indicate a tile is inside a triangle per most recently used bit.

18. The media of claim 10 further storing instructions to perform the sequence including using a smaller capacity storage for cache lines in tiles entirely within the triangle and a larger capacity storage for cache lines in tiles partially overlapping the triangle.

19. The media of claim 10 further storing instructions to perform the sequence including storing an indication of less useful tiles in a first level cache only.

20. An apparatus comprising:
    a processor to determine whether a tile of pixels is inside, outside or partially outside of a triangle being rendered, indicate whether the tile is inside, outside or partially outside the triangle, use the indication to implement a cache line replacement policy with one bit to indicate if tile is inside the triangle; and
    a storage coupled to said processor.

21. The apparatus of claim 20 said processor to mark tiles of cache lines that are wholly inside the triangle.

22. The apparatus of claim 20 said processor to replace cache lines of tiles wholly inside a triangle before other cache lines are replaced.

23. The apparatus of claim 22 said processor to replace cache lines using two different second cache replacement policies.

24. The apparatus of claim 23 said processor to replace cache lines based on whether they are wholly within the triangle and then applying a different cache line replacement policy.

25. The apparatus of claim 20 said processor to use a smaller capacity storage for cache lines in tiles entirely within the triangle and a larger capacity storage for cache lines in tiles partially overlapping the triangle.

26. A computer executed method comprising:
    determining whether a tile of pixels is inside a triangle being rendered;
    indicating whether the tile is inside the triangle;

if using at least a recently used cache replacement policy, using one bit to indicate a tile is inside the triangle per least recently used bit or, if using a most recently used cache replacement policy, using one bit to indicate a tile is inside a triangle per most recently used bit.

27. The method of claim 26 including storing an indication of less useful tiles in a first level cache only.

28. One or more non-transitory computer readable media storing instructions to perform a sequence comprising:
    determining whether a tile of pixels is inside a triangle being rendered;
    indicating whether the tile is inside the triangle;
    if using at least a recently used cache replacement policy, using one bit to indicate a tile is inside the triangle per least recently used bit or, if using a most recently used cache replacement policy, using one bit to indicate a tile is inside a triangle per most recently used bit.

29. The media of claim 28, said sequence including storing an indication of less useful tiles in a first level cache only.

30. An apparatus comprising:
    a processor to determine whether a tile of pixels is inside a triangle being rendered, indicate whether the tile is inside the triangle, if using at least a recently used cache replacement policy, use one bit to indicate a tile is inside the triangle per least recently used bit or, if using a most recently used cache replacement policy, use one bit to indicate a tile is inside a triangle per most recently used bit; and
    a storage coupled to said processor.

31. The apparatus of claim 30, said processor to store an indication of less useful tiles in a first level cache only.

* * * * *